Nov. 15, 1938.  E. A. COLBY  2,136,610
PERTUSED ELECTRODE FOR ELECTRONIC TUBES
Original Filed Aug. 7, 1930   2 Sheets-Sheet 2
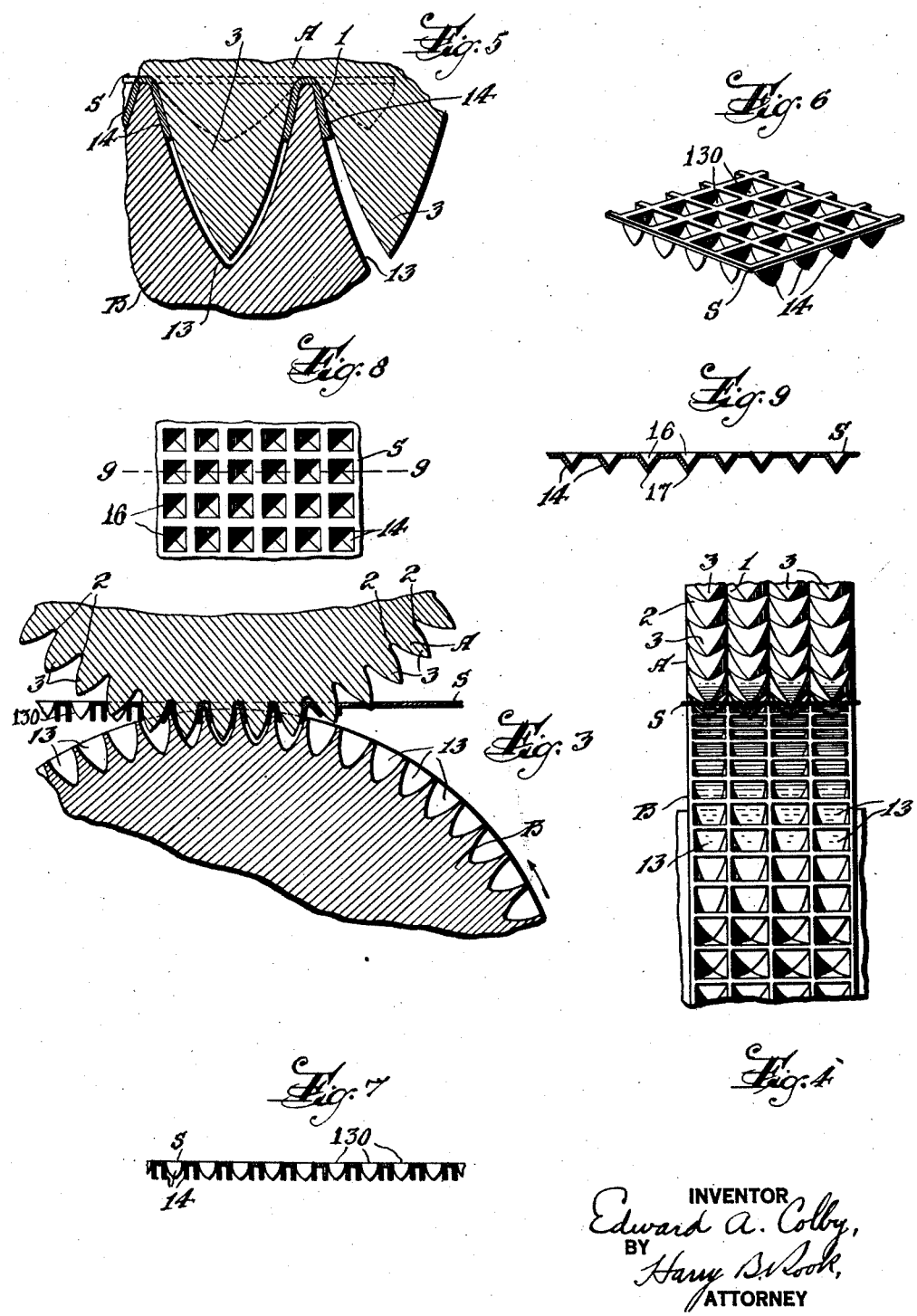

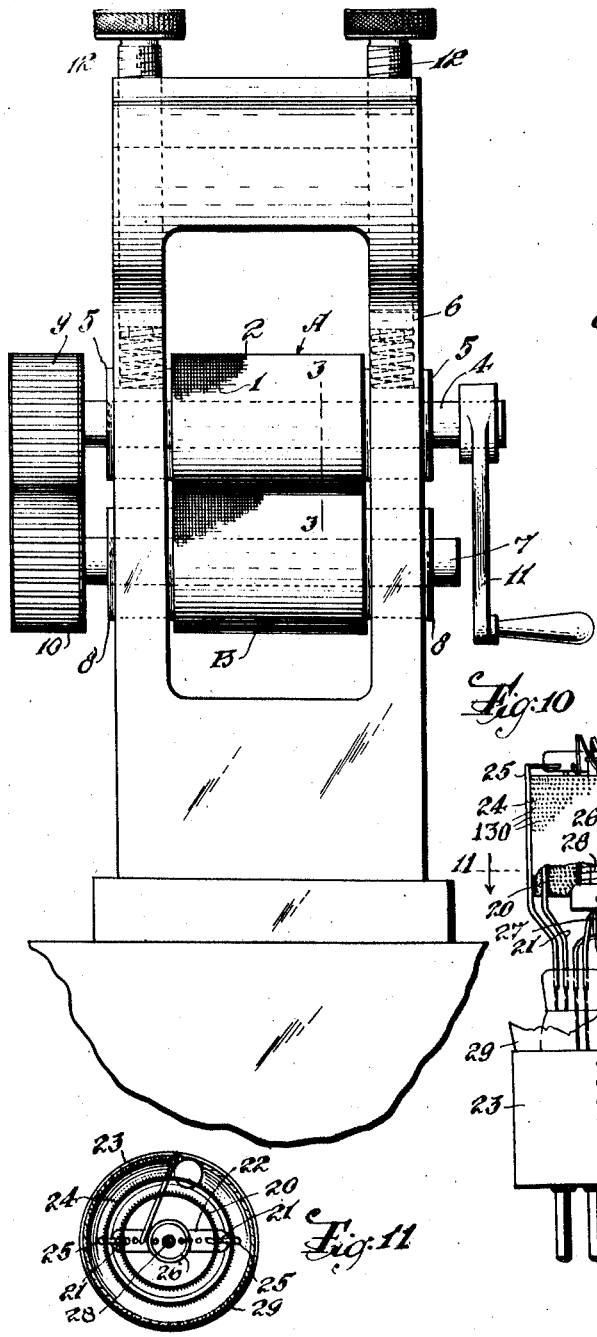

Patented Nov. 15, 1938

2,136,610

UNITED STATES PATENT OFFICE 2,136,610

PERTUSED ELECTRODE FOR ELECTRONIC TUBES

Edward A. Colby, Maplewood, N. J., assignor to Baker & Company, Inc., Newark, N. J., a corporation of New Jersey Original application August 7, 1930, Serial No. 473,730. Divided and this application February 11, 1933, Serial No. 656,355

7 Claims. (Cl. 250—27.5)

This application is a division or continuation of my copending application Serial No. 473,730, filed August 7, 1930, and the present invention relates particularly to pertused electrodes for electronic tubes, such as anode plates, screens, and oxide coated filaments.

Before my invention, woven wire gauze had been widely used in the manufacture of electrodes such as grids, anode plates and screens for electronic tubes. Solid, thin smooth surfaced sheets of metal were also used to a minor degree in the manufacture of anode plates and screens. Because of the mechanical weakness of woven wire gauze, it is both difficult and expensive to form electrodes therefrom with the required accuracy of dimension and to rigidly support them in electronic tubes, unless the volume of metal used is appreciably greater than would be needed in a one-piece metal electrode. Furthermore, because the intersecting wires in such woven wire electrodes are loosely crimped they are easily displaced by rough handling, which effects changes in the electrical characteristics of the tube in which they are used, and may, if the wires are free to oscillate, give rise to objectionable hum in service. Wire gauze electrodes are also less efficient conductors of heat and electricity and have a lower heat radiation capacity than an imperforate or solid sheet metal electrode of the same composition, form, mass and surface finish. As to sheet metal electrodes, in order to make them sufficiently rigid to withstand vibration and to stably support them in electronic devices, it has been necessary to make them thicker than is required to fulfill the electrical requirements. Also, thin sheet metal anode plates heretofore used have smooth surface finishes which are poor heat radiators even when the surfaces are carbonized to reduce electron emission in opposition to that from the cathode. Furthermore, these structural deficiencies of known woven wire and sheet metal electrodes cause difficulty in the process of evacuating electronic tubes during which it is customary to heat the internal electrodes to temperatures just short of their fusing point, by inducing high frequency electric currents, for the purpose of expelling occluded gases contained in the metals. The efficiency and uniform completion of this evacuating process is dependent upon both the mass and structural form of the metal electrodes, and non-uniform or poor heat and electrical conductivity and thick or large masses of metal make difficult the expulsion of gases from the metals.

None of the electrode structures heretofore used in a given type of electron tube possess all the desirable features of low cost of production, rigidity of form with minimum mass of metal, uniformity of heat and electrical conductivity with maximum heat radiating capacity. So far as electronic action per se is concerned, in a given type of tube it is independent of the mass of electrodes, but continuity of action is dependent upon structural form, rigid maintenance of the relative position of the electrodes, and the perfection of evacuation.

Accordingly one object of my invention is to provide a novel and improved electrode for electronic tubes which shall overcome the foregoing objections, difficulties and disadvantages of known electrodes, and which shall be mechanically strong and rigid, shall consist of one piece of material instead of a plurality of interwoven wires, shall be free from material vibration during operation, shall permit easy and practically complete expulsion of occluded gases therefrom, shall efficiently and quickly radiate heat, shall have uniform electrical and heat conductivity throughout, shall be of minimum weight per unit of surface area, which can be easily formed or bent and assembled, and which, therefore, shall constitute an inexpensive and highly efficient electrode.

I have discovered that extremely thin ductile sheets of metal, such as sheets of the order of foil, for example, of a thickness of from .0078 to .0005 of an inch, having a large number of minute pertusions per unit of area, for example several hundred to several thousand pertusions per square inch, are admirably suitable for use in electrodes for electronic tubes, especially in anode plates, screens and oxide coated filaments; and another object of my invention is to provide an electrode for electronic tubes comprising a pertused sheet of this character.

Other objects, advantages and results of my invention will be brought out by the following description.

A pertused sheet of the general character described is set forth and claimed in my above-mentioned copending application, while the method of and apparatus for making such a sheet are described and claimed in my copending application Serial No. 656,356 filed February 11, 1933, now Patent No. 1,938,318 granted Dec. 5, 1933.

For a clear understanding of the present invention, the sheet, method and apparatus are hereinafter described and illustrated in the accompanying drawings, in connection with the illustration and a description of my improved electrode.

Referring to the accompanying drawings, in which corresponding and like parts are designated throughout the several views by the same reference characters, Figure 1 is a front elevation of one apparatus for producing minute pertusions or deformations on the surfaces of sheets of ductile material, in accordance with my invention;

Figure 2 is an end elevation thereof;

Figure 3 is an enlarged fragmentary transverse vertical sectional view on the line 3—3 of Figure 1, showing the manner of passing the material between the rolls;

Figure 4 is a front elevation of the rolls illustrated in Figure 3;

Figure 5 is an enlarged fragmentary sectional view of the two rolls showing the manner of cooperation of the teeth and recesses in forming the pertusions;

Figure 6 is a fragmentary perspective view of a pertused sheet of material made in accordance with the invention;

Figure 7 is a vertical sectional view through the sheet;

Figure 8 is a top plan view of a sheet of material which has been deformed, as for reenforcement, in accordance with the invention.

Figure 9 is a vertical sectional view on the line 9—9 of Figure 8;

Figure 10 is a fragmentary side elevation of an electronic tube containing electrodes embodying my invention, portions being broken away for clearness in illustration;

Figure 11 is a horizontal sectional view on the line 11—11 of Figure 10.

Figure 12 is a view similar to Figure 10 showing another form of electrode and

Figure 13 is a horizontal sectional view on the line 13—13 of Figure 12.

I will first describe one apparatus and method by which a sheet for electrodes is made so that the character of the sheet may be more fully understood. The reference character A designates a steel cylinder or roll of the desired diameter and length, and which has on its periphery a plurality of teeth to cooperate with corresponding recesses in a second cylinder or roll B, in pertusing a sheet. The diameter of the rolls will vary in accordance with the thickness of the sheets to be operated upon and the number of pertusions desired for each unit of area, while the length of the rolls will vary with the width of the sheet to be produced.

In making the roll A, a cylinder of high grade steel, for example tool steel, has a groove 1 with or without lead, cut in its periphery of the desired pitch, shape and depth, according to known machine shop methods. The roll is then grooved longitudinally, as at 2, parallel to its axis, to form teeth 3, and preferably the longitudinal grooves or cross-cuts have the same shape, pitch and depth as the groove 1. The shape, pitch and depth will of course vary with the size and shape of the teeth desired; for example, if 80 teeth per linear inch or 6,400 teeth per square inch surface are desired, the pitch will be .0125 of an inch. Preferably each tooth is polygonal in plan, and has at least one side inclined to the axis of the tooth so as to displace rather than shear the material of the sheet to be pertused. For example, the teeth may be substantially square, and generally pyramidal, as shown. After the roll has been so machined, it is hardened according to known processes.

The roll B may be made of the same or softer material, or may have a surface formed of softer material, than the roll A, and I have found copper alloys mounted on a steel shaft to be very satisfactory.

If the material to be pertused is itself sufficiently hard to have a wearing action on the surfaces of the recesses in the roll B, the composition of this roll or its peripheral surface may be such that it can be hardened by heat treatment after formation of the recesses.

This roll B is formed with its recesses by a rolling action under pressure between the two rolls A and B, which action may be performed in any suitable manner. As shown, the roll A may be mounted on a shaft 4 journaled in slide bearings 5 in a frame 6, while the roll B may be mounted on a shaft 7 mounted in slide bearings 8 in the frame. The two shafts are geared together by pinions 9 and 10, and one of the shafts may be rotated by a crank 11. The two rolls are forced together into peripheral contact as by compression screws 12 engaging the slide bearings 5 of the shaft 4. With the rolls thus arranged the peripheral faces are gradually forced together by the compression screws 12 while the rolls are rotated, and as the result the teeth 3 of the roll A are forced into the surface of the roll B so as to form recesses 13 corresponding in size and shape to the teeth 3. The two rolls being geared together, the spacing and alinement of the teeth and recesses are maintained extremely accurate, the recesses forming matrices of exactly the same shape, size and spacing as the teeth in the roll A. For making a pertused sheet of the specific form herein described the teeth and recesses are of a number of the order of several hundred to several thousand per square inch, and preferably are spaced so that the aggregate face areas of the portions of the peripheries of the rolls between the teeth and recesses, respectively, is less than the aggregate areas of the bases of its teeth or the aggregate face areas of the recesses. Also, preferably the portions of said peripheries between the teeth and the recesss, respectively are in the same plane.

In pertusing sheets of ductile material, for example, nickel, a sheet S is fed continuously between the rolls A and B which are continuously rotated in the proper direction, as indicated by arrows on Figure 3, and the rolls being pressed together, the teeth 3 penetrate or pierce the sheet and force the displaced portions thereof into the recesses or matrices 13, as clearly shown in Figures 3 and 5, to form perforations or pertusions 130. These displaced portions 14 form side walls for the corresponding perforations and project from one side of the sheet. Also, these side walls are of an aggregate surface area substantially equal to the area of the corresponding perforations, and the perforated sheets thus remain of the same weight and aggregate surface area as an imperforate sheet of the same dimensions. It will be observed that the perforations will be uniformly spaced, and that a large number of perforations per unit of area can be produced. Also the rigidity of the sheet is increased by the projections 14 which are disposed edgewise to the sheet and to each other in rows extending across the sheet.

Obviously, the length of the side walls 14 of the perforations will depend upon the space between the peripheral faces of the two rolls, the depth of the teeth, etc., while the area of the perforations depends upon the shape of the teeth and extent of penetration thereof. This is illustrated in Figure 5 of the drawings where the teeth are shown with convexly curved sides 15 whereby it is possible to obtain perforations of greater area for the same depth of penetration than would be possible with straight-sided teeth.

As shown, the pertusions are rectangular faced, that is they are rectangular in shape on the surface of the sheet, and the aggregate face areas of said pertusions is substantially greater than the aggregate areas on the face of the sheet of the portions of the sheet between the pertusions, as shown in Figures 6 and 7. All portions of the sheet between the openings are substantially in the same common plane of the sheet, the openings are uniform in size and regular in shape.

It will be observed that if the teeth should be formed with flattened apexes, or if the rolls should be separated to a greater extent when passing the sheet therebetween, minute deformation without penetration of the sheet is possible, as illustrated in Figures 8 and 9 of the drawings, where the deformation consists of a plurality of depressions 16 at one side of the sheet and corresponding projections 17 at the other side. Such an operation results in hardening of the sheet and increases the rigidity or stiffness of very thin sheets of metal, especially in directions oblique to the rows of depressions. This operation is particularly advantageous where it is desired to obtain the maximum rigidity of extremely thin sheets of metal, without the perforation of the metal. Preferably, the sheet is cut into sections or pieces so that the depressions are disposed obliquely or diagonally of the sections.

In the drawings, the perforations or pertusions 130 are shown as approximately square and produced by teeth, the pitch of which in the two planes at right angles is the same. Should the pitch of the teeth in the two planes differ, the pertusions would have unequal sides. As clearly shown in Figures 3 and 5 of the drawings, the material is penetrated by the points of the individual teeth and then split into the four triangular-shaped segments or displaced portions 14 which have their apexes at the point of penetration. These four triangular-shaped segments are by proper shaping of the individual teeth spread apart as the rolling operation is completed, so that each pertusion has practically a uniform cross-section from base to apex. The sheet thus produced has one smooth flat side, while the other side is covered with several thousand triangular projections 14 per square inch of surface area. Assuming that the sheet of material is .001 of an inch in thickness, these triangular projections may extend about .008 of an inch above the face side of the sheet.

Sheets of metal made according to the invention when used in making plates, screens, and oxide coated filaments for electronic tubes, provide greater rigidity with less weight of material for the same surface area than is possible in the forms now used; and the hum due to vibration of crimped wires now used is eliminated. Also, the complete expulsion of occluded gases in the material is facilitated in the bombarding process. Sheets embodying the invention have uniform electrical resistance and heat conductivity, and greater heat radiating capacity than smooth surface electrodes of the same metal and surface area and the sheets may be rolled or bent without breaking, which are especially desirable characteristics in the manufacture of electrodes for electronic tubes. Also, it will appear that the sheet is a screen of the order of woven wire screens formed of wire of from, for example, about .0078 to about .0005 of an inch in diameter, and having from several hundred to several thousand perforations per square inch which preferably are so spaced that the aggregate face areas of said perforations is substantially greater than the aggregate face areas of the portions of the sheet between the perforations. A perforated sheet of such thickness is of the general order of foil and metal leaf, but has great rigidity and a yielding resistance to bending which are substantially uniform in all directions so that the sheet can be shaped as desired. The sheet also has an aggregate surface area equal to or greater than that of an unpertused sheet of the same dimensions. The points or wells 14 provide for more rapid radiation of heat from the sheet than would be possible with a smooth sheet, which is advantageous in reducing electronic emission from an anode plate, and said points and the openings will also serve to securely hold a coating on the sheet, for example, a coating of chemicals such as is commonly used in oxide coated filaments for electronic tubes.

The sheet is shown in Figures 10–13 inclusive as applied to several different electrodes for electronic tubes. The electrodes and their mountings are shown in the same general form and for the same purpose as known electrodes, the only material difference between known electrodes and those illustrated being that the electrodes shown in Figures 10–13 are formed of pertused sheets of metal like that hereinbefore described instead of woven wire screen or gauze or smooth surfaced solid sheets.

Referring to Figures 10 and 11 the invention is shown as embodied in a cylindrical tubular plate 40 or anode 20 which is formed of a piece of my pertused metal mounted on lead in wires 21 which are embedded in a glass stem 22 that is mounted in a base 23 in the usual known manner, in surrounding relation to the grid 26 and cathode 28.

The invention may also be embodied in a tubular screen or shield 24 which surrounds the plate 20 in the usual manner and is mounted on support wires 25 embedded in the glass stem 22.

In Figures 12 and 13 another form of plate or anode is shown, comprising two strips 30 and 31 of pertused sheet metal secured together by clinching tongues 32 on one piece through slots 33 in the other piece, in known manner, the two strips being shaped complementally to form a tubular portion 34 to surround the grid 35 and cathode 36. The anode is mounted on wire supports 37 secured in a glass stem 38, as usual, with substantially the entire area of the outer surface of the anode in direct heat radiating relation to a glass bulb 29.

All of the electrodes are enclosed in a glass casing or bulb 29 in known manner, and the electronic tube containing electrodes embodying the invention operates on the same principle as known electronic tubes of the character described. However, electrodes formed of pertused sheet metal have important advantages over known electrodes in the ease of manufacture and assembly thereof, their rigidity with a minimum of material for a unit of surface area, a maximum of surface area, the elimination of hum during operation, uniform heat and electrical conductivity, and efficient radiation of heat, as above described.

Having thus described my invention, what I claim is:

1. An electrode for electronic tubes formed of a sheet of suitable ductile metal having a plurality of polygonal pertusions therein each comprising an opening having at all sides approximately triangular walls of substantially equal size integral with the sheet formed by the material displaced by the pertusing operation and projecting substantially perpendicularly from one side of the sheet.

2. An electrode for electronic tubes formed of a thin flexible sheet of ductile metal of a thickness of the order of foil having a plurality of rectangular faced pertusions of a number of the order of at least several hundred per square inch, the aggregate face areas of said pertusions being substantially greater than the aggregate face areas of the portions of the sheet between the pertusions, each pertusion comprising an opening having a wall at each side thereof projecting integrally and angularly from one side of the sheet.

3. An electrode for electronic tubes comprising a sheet of metal of a thickness of the order of foil having pertusions of a number of the order of several hundred per square inch and each pertusion having side walls formed of the metal displaced to form the pertusions projecting integrally and angularly from one side of the sheet, the other side of the sheet being substantially smooth.

4. A tube for radio receiving sets having a glass bulb, a cathode, a grid, and an electrode comprising a piece of sheet metal of a thickness of the order of foil surrounding the cathode, substantially the entire area of the outer surface of the sheet metal being in direct heat radiating relation to the glass bulb, said sheet of metal having at least several hundred pertusions to the square inch of small size and closely spaced, each pertusion having side walls formed by the metal displaced to form the pertusions projecting integrally and angularly from one side of the sheet, the other side of the sheet being smooth.

5. An electrode for electronic tubes comprising a ductile sheet of metal of a thickness of the order of foil having pertusions therethrough of a number of the order of several hundred per square inch and each pertusion having side walls formed of the metal displaced to form the pertusion projecting integrally and angularly from the sheet.

6. An electrode for electronic tubes comprising a ductile sheet of metal of a thickness of the order of foil having pertusions therethrough of a number of the order of several hundred per square inch, the metal displaced to form the pertusions projecting integrally and angularly from the sheet to increase the rigidity and heat radiating properties of the electrode.

7. An electrode for electronic tubes comprising a ductile sheet of metal of a thickness of approximately .003" and provided with approximately 1000 pertusions per square inch, each pertusion having side walls formed of the metal displaced to form the pertusions projecting integrally and angularly from the sheet.

EDWARD A. COLBY.